(12) United States Patent
Hobon et al.

(10) Patent No.: US 8,216,662 B2
(45) Date of Patent: Jul. 10, 2012

(54) GLASS-CERAMIC PLATE AND METHOD FOR MAKING SAME

(75) Inventors: Carol Hobon, Nemours (FR); Alain Renault, La Madeleine/Loing (FR); Helene Harmand, Paris (FR); Pablo Vilato, Paris (FR)

(73) Assignee: Eurokera S.N.C., Chateau-Thierry (FR)

( * ) Notice: Subject to any disclaimer, the term of this patent is extended or adjusted under 35 U.S.C. 154(b) by 1119 days.

(21) Appl. No.: 10/516,512

(22) PCT Filed: Jun. 25, 2003

(86) PCT No.: PCT/FR03/01952
§ 371 (c)(1),
(2), (4) Date: Dec. 1, 2004

(87) PCT Pub. No.: WO2004/008807
PCT Pub. Date: Jan. 22, 2004

(65) Prior Publication Data
US 2005/0118382 A1 Jun. 2, 2005

(51) Int. Cl.
*B32B 3/00* (2006.01)
*B32B 23/02* (2006.01)
*F24C 15/10* (2006.01)
*F24C 3/00* (2006.01)

(52) U.S. Cl. ...... 428/156; 428/192; 126/39 H; 126/211; 219/460.1

(58) Field of Classification Search ............ 428/156, 428/172, 66.7, 192; 219/452.11, 452.12, 219/460.1, 444.1; 126/39 H, 211
See application file for complete search history.

(56) References Cited

U.S. PATENT DOCUMENTS

| | | | |
|---|---|---|---|
| 2,414,162 A * | 1/1947 | Morton | 219/452.11 |
| 3,674,983 A * | 7/1972 | Hurko et al. | 219/467.1 |
| 5,549,100 A | 8/1996 | Heisner et al. | |
| 5,885,315 A | 3/1999 | Fredholm et al. | |
| 6,636,370 B2 * | 10/2003 | Freeman | 359/894 |
| 2002/0023915 A1 | 2/2002 | Taplan | |

FOREIGN PATENT DOCUMENTS

| | | |
|---|---|---|
| DE | 196 33 706 | 2/1998 |
| DE | 19633706 A1 * | 2/1998 |
| WO | 02/45909 | 6/2002 |

* cited by examiner

*Primary Examiner* — Catherine A Simone
(74) *Attorney, Agent, or Firm* — Oblon, Spivak, McClelland, Maier & Neustadt, L.L.P.

(57) ABSTRACT

A glass-ceramic plate intended in particular to cover heating elements, and having at least one bevel 35 mm or more wide, a method of manufacturing the plate, and a cooking appliance including the plate.

21 Claims, 1 Drawing Sheet

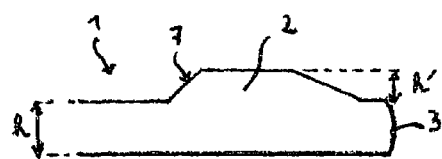
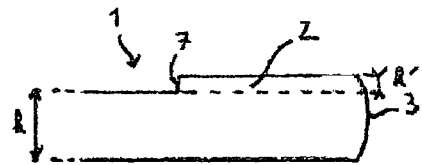
FIG 1a    FIG 1b
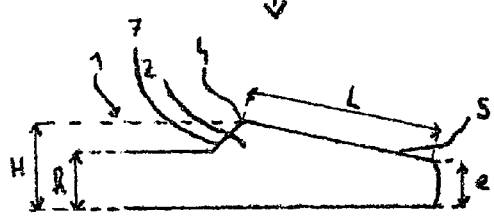
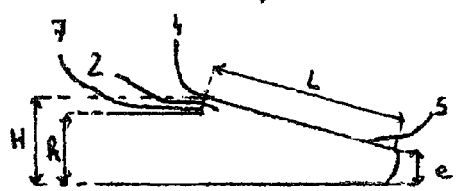
FIG 2a    FIG 2b
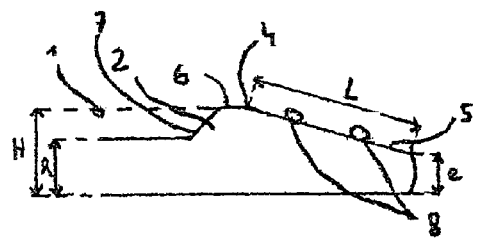
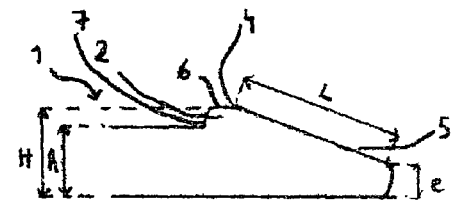
FIG 3a    FIG 3b
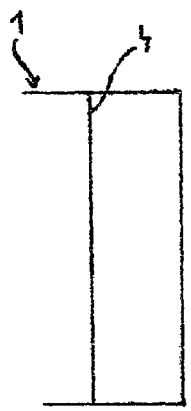
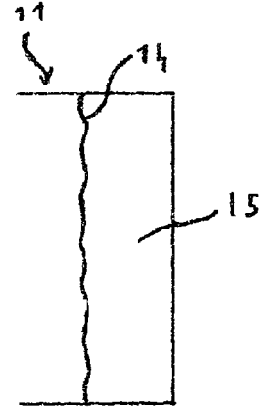
FIG 4    FIG 5

GLASS-CERAMIC PLATE AND METHOD FOR MAKING SAME

The present invention relates to a glass-ceramic plate intended in particular to cover heating elements, particularly intended to act as a hot plate, the underlying heating elements associated with this plate being, for example, halogen or radiant or induction hot plate elements.

BACKGROUND OF THE INVENTION

Sales of glass-ceramic hot plates have been increasing constantly for several years. This success is particularly explained by the attractive appearance of these plates and by their ease of cleaning.

Let us remember that a glass-ceramic originates from a glass, known as a precursor glass, the specific chemical composition of which allows by suitable heat treatment known as ceramification (or ceramization) to bring about controlled crystallization. This partially-crystallized specific structure gives the glass-ceramic unique properties.

There are currently different types of glass-ceramic plates the appearance of which can vary according to the type of heating used or the end-use: plates that are white or black, with or without openings (for example, openings for burners), having local deformations (support blocks), curved or straight shapes, inclined edges, etc. Each alternative form is the result of significant study and numerous tests given that it is very tricky to modify these plates (for example their composition) and/or the method of obtaining them (changing the temperature for example) without risking an unfavorable effect on the desired properties (solid structure, resistance to thermal shock, smooth appearance, high transmission in the wavelengths in the infrared domain and low transmission in wavelengths in the visible domain without in any way concealing the heating elements when they are on for safety reasons, etc).

Thus, it is known practice for the edge of the plates to be beveled using grinding techniques to give a better appearance and to allow more ergonomic operation and ease of cleaning, without detracting from the mechanical strength of the plates, as long as the bevels remain of limited width (well below 35 mm, these bevels generally being of the order of 12 mm wide), increasing the width of the bevels hitherto posing problems, particularly irregularity of the line along the crest of the bevels.

SUMMARY OF THE INVENTION

The present invention has therefore set itself the task of providing plates with a novel appearance, particularly ones having wider bevels than existing plates without the problems mentioned above and without detrimental effects on the other desired properties of the plates.

The plate according to the invention is thus a plate, such as a glass-ceramic plate, intended in particular to cover heating elements, this plate having at least one bevel 35 mm or more wide and/or having at least one bevel following a raised portion (particularly and preferably a raised portion in the form of an additional thickness).

The present invention also relates to a method of beveling a plate, such as a glass-ceramic plate, which consists in forming at least one raised portion (particularly an additional thickness) on the plate and in beveling from the raised portion.

The present invention also relates to a method of manufacturing a plate such as a glass-ceramic plate, in which method at least one bevel is cut (particularly at least one edge is beveled) using the method defined above.

A glass-ceramic plate is to be understood not only to mean plates made of glass-ceramic proper but also plates made of any other similar material able to withstand high temperatures and having a zero or practically zero expansion coefficient (for example one less than $15 \cdot 10^{-7}$ $K^{-1}$). As a preference, however, it is a glass-ceramic plate proper. Likewise, the invention is not restricted to the manufacture of hot plates for cookers or hobs but may also relate to other plates which need to be very insensitive to temperature variations.

The plate according to the invention is chiefly defined by the fact that it has at least one bevel 35 mm or more wide. At the same time, the invention also covers a plate having at least one bevel following a raised portion, in conjunction with the method disclosed in the present invention to obtain a wider bevel as desired, the latter embodiment not, however, excluding the advantageous obtaining of smaller bevels (measuring less than 35 mm). Note that the bevel according to the invention, generally on at least one edge or around the periphery of the plate, advantageously faces toward the outside of the plate (in other terms, the lowest point on the bevel is closest to the edge or the outside of the plate than the highest point), particularly for esthetic considerations and ease of mounting (in particular, the bevel can be designed to end on the edge of the plate so that the plate lies flush with the work surface on which it is mounted, to allow better assembly). Advantageously, the presence of the bevel or bevels facing outward around the edge of the plate does not weaken the plate in that the bevel is cut in a raised portion and in that a minimum heel or thickness is left around the edge and/or in that the raised part is preferably solid (additional thickness). In general, the bevel has a different surface finish from the rest of the plate, particularly is polished, bright, straight, with a well-defined crest line (forming a clean angle with the rest of the plate rather than a rounded angle) due in particular to the preferred method, explained later, of obtaining it, forming an additional thickness, particularly by rolling, then shaping the bevel on the additional thickness.

In general, the plate according to the invention may have one or more bevels or beveled parts, particularly one or more beveled edge(s) wider than the bevels usually made on glass-ceramic plates, and in particular may have one or more bevel(s) 35 mm or more wide, for a plate thickness that generally remains less than 4.5 mm and preferably less than 4.2 mm, this being for any type of glass-ceramic plate. The width of the bevel is to be understood as meaning the actual width measured on the plate (width L measured along the slope from the top to the bottom of the bevel as illustrated later in the figures) and not the width projected onto the plane of the plate. In particular, it is advantageous to provide a very wide bevel on the side of the plate that is intended to receive the one or more means of controlling the heating elements (control knobs, temperature or time display, etc) to give the user a better appreciation of it, better access to said elements, and to improve the esthetics. As appropriate, the raised portion adjacent to the bevel may also form a barrier protecting said control elements when products are spilt on the plate.

As mentioned previously, the cutting of a wide bevel is in particular rendered possible by the raised portion (particularly when this is an additional thickness or surplus material or additional material) generated at the desired location of the bevel in the plate. The bevel passes across at least one part of the raised or extra-thick portion and is generally continued (although it is not necessarily) into a part of the "standard" thickness (that of the plate without the raised portion) of the plate. As a preference, the thickness of the plate at the top of the raised portion (after beveling, or before beveling if the latter follows a heat treatment such as ceramification, of the plate) does not exceed twice and preferably 1.5 times the standard thickness of the plate, this being so as to avoid problems particularly of deformation during heat treatment of the plate. Also as a preference, a heel (or minimum thickness) of at least 2 mm (or even of at least 2.5 mm) is left in the plate at the lowermost point of the bevel so as to maintain good mechanical strength properties in the plate, particularly when the bevel faces toward the outside as mentioned earlier.

According to an embodiment of the invention, the bevel may be generated at the same time as the raised portion for example by a rolling operation. This rolling is then generally performed when the glass is still malleable (or "soft") using a roller which at its periphery bears the hollow impression (generally with dimensions, particularly at least in terms of depth, of the order of or slightly greater than the dimensions of the raised portion—with bevel where appropriate—desired), performed for example by machining, of the raised portion with the desired bevel. This rolling may for example coincide with the shaping rolling usually performed on leaving the furnace on the precursor glass while it is still malleable.

According to another embodiment mentioned earlier, the bevel following (on from) a raised portion is, however, preferably obtained in at least two steps, the first consisting in generating a raised portion (or relief) on the plate, for example by rolling (using an appropriate machined roller exhibiting the hollow impression of the raised portion, the dimensions of the impression generally being of the order of or slightly greater than the dimensions of the raised portion as mentioned earlier, this rolling also coinciding for example with the rolling to shape), and the second consisting in performing the beveling, by shaping (for example by polishing, using inclined grinding wheels, etc) from said raised portion. This embodiment is particularly advantageous; the bevel obtained in particular has a particularly flat and smooth surface finish (a bevel obtained directly by rolling according to the previous method could for its part have a less smooth appearance or a profile slightly hollowed or rounded at certain points).

The raised portion may also be generated by means other than rolling, particularly by any other pressing means, or alternatively by molding or possibly by forming a fold. Advantageously the raised portion consists of an additional thickness, involving increasing the thickness rather than stamping the plate to give rise to a deformation on both sides. As the presence of (a) bevel(s) is usually sought on just one side of the plate (generally the upper side in the position of use), the opposite side is preferably not affected by the operation of forming the raised portion or portions for producing the bevel or bevels and generally remains approximately flat (smooth or equipped with pegs to improve its mechanical strength) where facing said raised portion or portions and said bevel or bevels formed from this or these raised portion(s).

In a preferred embodiment, the raised portion or portions may for example be generated on leaving the furnace on the malleable precursor glass during the operation of rolling to shape, then, after any possible cutting and/or shaping of the plates, and as appropriate after decoration (coating for example with an enamel forming one or more patterns), each plate may, depending on the situation, be ceramified (converting the precursor glass into glass-ceramic) then beveled (in this case, beveling is performed only on "good" plates), or conversely may be beveled before being ceramified (in which case beveling is done on a softer material), the beveling being done at the raised portion or portions. Preferably, a bevel according to the invention (a "large" bevel, that is to say one 35 mm or more wide and/or a bevel following a raised portion) is provided on at least one side (or edge or edging) of the plate (preferably on the side that is to receive the control elements), or even on all the sides (or edges) of the plate.

As a preference according to the invention, the ratio of the width L of the bevel to the height of the bevel (or height of the beveled part, this height h" corresponding, in the figures depicted later, to the value H–e), expressed in the same units, is less than 23.3 and preferably less than 22. The crest (or top) line of the bevel obtained is particularly straight, in particular, any undulations on either side of the straight line joining the two ends of the crest line remain minimal and generally barely perceptible with the eye, unlike the clearly visible undulations seen in the event of direct beveling over a large width on a plate that has no additional thickness.

Depending on the situation, the bevel extends over the width of the raised portion or over just part of its width, and possibly extends also over part of the width of the plate not including the raised portion. On the opposite side of the raised portion to the beveled part, the crest line may continue in the form of a sheer face or a slope or a region for example horizontal, such as a flat, as exemplified hereinafter.

The invention also relates to cooking and/or temperature-maintaining appliances comprising at least one plate according to the invention (for example cookers and built-in or slot-in hobs) and comprising, as appropriate, one or more heating elements such as one or more radiant and/or halogen elements and/or one or more atmospheric gas burners and/or one or more induction heating elements. The invention encompasses both cooking appliances comprising just one plate and appliances comprising several plates, each of these plates having a single source or multiple heating sources. The term "source" here is intended to mean a cooking spot. The invention also relates to mixed cooking appliances in which the hot plates comprise several types of source (gas sources, radiant sources, halogen sources or induction sources).

The plate according to the invention can also be equipped with functional or decorative elements, generally added on, such as one or more connector(s) and/or cables(s), one or more control element(s), etc.

The plate according to the invention may have a smooth underside or may be equipped with pegs increasing its mechanical strength and obtained for example by rolling. The plate may also comprise at least one region in relief and/or at least one recessed region and/or at least one opening, for example, in the case of a gas cooker, at least one opening intended to take an atmospheric gas burner. Provision may be made for this opening to be shaped and for it to lie at the top of a local deformation of the plate as described in patent application FR 97 061114 filed on May 20, 1997.

BRIEF DESCRIPTION OF THE DRAWINGS

Other details and advantageous characteristics will become apparent hereinafter from the description of some nonlimiting embodiments of the invention, with reference to the attached drawings in which:

FIGS. 1a and 1b schematically depict in side view the ends of plates obtained after the formation of a raised portion or additional thickness in a first step of a method according to the invention;

FIGS. 2a, 3a and 2b, 3b schematically depict in side view various alternative forms of the same ends of these same plates after various beveling operations;

FIG. 4 depicts a schematic view from above of the beveled end of the plate of FIG. 2b;

FIG. 5, which is a comparative figure, shows a schematic view from above of the end of a plate not provided beforehand with a raised portion or additional thickness and having a bevel of the same width as that of the plate in FIG. 4.

DETAILED DESCRIPTION OF THE INVENTION

For purposes of clarity, the various parts are not necessarily drawn to scale. The same references are used for similar parts.

In these embodiments, the glass having for example a composition such as one of those indicated in the examples in patents FR2 657 079 or FR 2 766 816 is melted at around 1650° C. in a quantity such that a strip of glass can be rolled, from which strip plates 1 with finished sizes of the order of 55 cm×60 cm, and having a standard thickness h of 4 mm are cut.

The top roll used for rolling has a hollow impression of a depth for example of the order of or slightly greater than 2 mm and of a profile corresponding approximately to the profile of the additional thickness that is to be generated, the bottom roll for its part being engraved to form pegs (not depicted) on the underside of the plate. In the case of FIG. 1a, the additional thickness 2 is generated on the plate a few millimeters away from the cut region (and therefore from the edge of the plate obtained after cutting), and in the case of FIG. 1b it is generated in contact with said cut region (and therefore on the edge of the plate obtained), the height h' of the additional thickness being, for example, of the order of 2 mm. The rolled plates may be decorated, for example using an enamel, or holed for the later incorporation of control elements. After the cutting of the plates, these plates may also be shaped, particularly along their edge face 3, in order to avoid, for example, the presence of sharp edges that might injure the users.

These glass plates are then, in a way known per se, ceramified according to a ceramification cycle comprising, for example, the following steps:
a) raising the temperature at 30 to 80 degrees/minute to the nucleation domain, generally situated near the glass transformation domain;
b) passing through the nucleation range (670-800° C.) in 15 to 25 minutes;
c) raising the temperature in 15 to 30 minutes to the ceramification threshold (or plateau) temperature of between at 900 and 1100° C.;
d) holding the temperature at the ceramification threshold for a time of 10 to 25 minutes;
e) rapid cooling to ambient temperature.

At the end of the ceramification cycle, the glass plate contains the quartz β or spodumene β crystalline phase.

Before or after the ceramification operation, a beveling operation is performed on the additional thickness 2 using an inclined grinding wheel. A bevel 5 is obtained, with a height h" corresponding to the value H–e (H being the thickness of the plate at the top of the bevel and e that at the base of the bevel, this thickness e here coinciding with the thickness of the remaining heel) for example ranging from 1.5 to 3.5 mm and with a width L ranging for example from 35 to 82 mm, the ratio L/h" advantageously remaining less than 23.3 and preferably less than 22. The bevel has a perfectly straight crestline 4 (as shown schematically in FIG. 4) and may be continued by a flat 6 and/or by an inclined or straight wall 7 of the additional thickness. Advantageously, a heel with a thickness e of at least 2 mm, and preferably at least 2.5 mm, is left at the end of the plate. Depending on the end-use of the plate, the latter may also undergo other operations during its manufacture (deformations to make bosses, for example, or holes, etc) and may also be equipped with attached elements such as control elements 8 (depicted in FIG. 3a).

Note that the crest line 14 of a bevel 15 of the same width L produced on a similar plate 11 but without the additional thickness and keeping the same minimum heel differs from the crest line of the previous plates obtained according to the invention in that it undulates and is not perfectly straight, as depicted in FIG. 5.

The plates according to the invention may in particular be used with advantage to produce a new range of hot plates for cookers or hobs.

The invention claimed is:

1. A glass-ceramic plate configured to cover heating elements, the glass-ceramic plate comprising:
   a body including a glass-ceramic material, the body having an upper surface and a lower surface; and
   at least one bevel 35 mm or more wide formed at a first edge of the upper surface,
   the at least one bevel having a thickness in a direction perpendicular to the lower surface of the glass-ceramic plate decreasing along the bevel in a direction from an interior portion of the glass-ceramic plate to the first edge, and a ratio of width of the at least one bevel to a height of the at least one bevel is less than 23.3.

2. The glass-ceramic plate as claimed in claim 1, wherein the at least one bevel receives one or more mechanisms configured to control the heating elements.

3. The glass-ceramic plate as claimed in claim 1, wherein the at least one bevel follows a raised portion, and the thickness of the glass-ceramic plate at a top of the raised portion is less than or equal to twice a standard thickness of the glass-ceramic plate.

4. The glass-ceramic plate as claimed in claim 1, wherein a thickness of at least 2 mm is left in the glass-ceramic plate at a thinnest point of the at least one bevel.

5. The glass-ceramic plate as claimed in claim 1, wherein the glass-ceramic plate includes the upper surface bearing the at least one bevel,
   and the lower surface remains approximately flat, smooth, or equipped with pegs, where facing the at least one bevel.

6. The glass-ceramic plate as claimed in claim 1, wherein the at least one bevel follows a raised portion, the at least one bevel extending over at least one of a part of a width of the raised portion and a part of a width of the glass-ceramic plate outside the raised portion.

7. The glass-ceramic plate as claimed in claim 1, wherein the thickness of the glass-ceramic plate along the at least one bevel tapers from a first thickness to a second thickness, the second thickness being less than a normal thickness of the glass-ceramic plate outside of the at least one bevel.

8. A glass-ceramic plate configured to cover heating elements, the glass-ceramic plate comprising:
   a body including a glass-ceramic material, the body having a first surface and a second surface substantially parallel to the first surface;
   at least one raised portion formed above the first surface with a first thickness of the raised portion greater than a thickness of the glass-ceramic plate outside the raised portion, a ratio of width of the raised portion to a height of the raised portion being less than 23.3; and
   at least one tapered portion following the at least one raised portion tapering from the first thickness of the at least one raised portion to a reduced thickness toward an edge of the glass-ceramic plate.

9. The glass-ceramic plate as claimed in claim 8, wherein the reduced thickness is smaller than a normal thickness of the glass-ceramic plate outside of the at least one tapered portion and the at least one raised portion.

10. A cooking and/or temperature-maintaining device, comprising:
  one or more heating elements; and
  a glass-ceramic plate configured to cover the one or more heating elements, the glass-ceramic plate including
    an upper surface and a lower surface, and
    at least one bevel 35 mm or more wide formed at a first edge of the upper surface,
    the at least one bevel having a thickness in a direction perpendicular to the lower surface of the glass-ceramic plate decreasing along the bevel in a direction from an interior portion of the glass-ceramic plate to the first edge, and a ratio of width of the at least one bevel to a height of the at least one bevel is less than 23.3.

11. A cooking and/or temperature-maintaining device, comprising:
  one or more heating elements; and
  a glass-ceramic plate configured to cover the one or more heating elements, the glass-ceramic plate including
    a first surface and a second surface substantially parallel to the first surface,
    at least one raised portion formed above the first surface with a first thickness of the raised portion greater than a thickness of the glass-ceramic plate outside the raised portion, and
    at least one tapered portion following the at least one raised portion tapering from the first thickness of the at least one raised portion to a reduced thickness toward an edge of the glass-ceramic plate, and a ratio of width of the at least one raised portion to a height of the at least one raised portion is less than 23.3.

12. A glass-ceramic plate configured to cover heating elements, the glass-ceramic plate comprising:
  a body including a glass-ceramic material, the body having an upper surface and a lower surface; and
  at least one bevel 35 mm or more wide formed at a first edge of the upper surface,
  the at least one bevel having a thickness in a direction perpendicular to the lower surface of the glass-ceramic plate decreasing along the bevel in a direction from an interior portion of the glass-ceramic plate to the first edge, the glass-ceramic plate including the upper surface bearing the at least one bevel, and the lower surface includes pegs where facing the at least one bevel.

13. The glass-ceramic plate as claimed in claim 12, wherein the at least one bevel receives one or more mechanisms configured to control the heating elements.

14. The glass-ceramic plate as claimed in claim 12, wherein the at least one bevel follows a raised portion, and the thickness of the glass-ceramic plate at a top of the raised portion is less than or equal to twice a standard thickness of the glass-ceramic plate.

15. The glass-ceramic plate as claimed in claim 12, wherein a thickness of at least 2 mm is left in the glass-ceramic plate at a thinnest point of the at least one bevel.

16. The glass-ceramic plate as claimed in claim 12, wherein a ratio of width of the at least one bevel to a height of the at least one bevel is less than 23.3.

17. The glass-ceramic plate as claimed in claim 12, wherein the at least one bevel follows a raised portion, the at least one bevel extending over at least one of a part of a width of the raised portion and a part of a width of the glass-ceramic plate outside the raised portion.

18. A glass-ceramic plate configured to cover heating elements, the glass-ceramic plate comprising:
  a body including a glass-ceramic material, the body having a first surface and a second surface substantially parallel to the first surface;
  at least one raised portion formed above the first surface with a first thickness of the raised portion greater than a thickness of the glass-ceramic plate outside the raised portion, the glass-ceramic plate including the first surface below the at least one raised portion, and the second surface includes pegs where facing the at least one raised portion; and
  at least one tapered portion following the at least one raised portion tapering from the first thickness of the at least one raised portion to a reduced thickness toward an edge of the glass-ceramic plate.

19. A cooking and/or temperature-maintaining device, comprising:
  one or more heating elements; and
  a glass-ceramic plate configured to cover the one or more heating elements, the glass-ceramic plate including
    an upper surface and a lower surface, and
    at least one bevel 35 mm or more wide formed at a first edge of the upper surface,
    the at least one bevel having a thickness in a direction perpendicular to the lower surface of the glass-ceramic plate decreasing along the bevel in a direction from an interior portion of the glass-ceramic plate to the first edge, the glass-ceramic plate including the upper surface bearing the at least one bevel, and the lower surface includes pegs where facing the at least one bevel.

20. A cooking and/or temperature-maintaining device, comprising:
  one or more heating elements; and
  a glass-ceramic plate configured to cover the one or more heating elements, the glass-ceramic plate including
    a first surface and a second surface substantially parallel to the first surface,
    at least one raised portion formed above the first surface with a first thickness of the raised portion greater than a thickness of the glass-ceramic plate outside the raised portion, and
    at least one tapered portion following the at least one raised portion tapering from the first thickness of the at least one raised portion to a reduced thickness toward an edge of the glass-ceramic plate, the glass-ceramic plate including the first surface bearing the at least one raised portion, and the second surface includes pegs where facing the at least one raised portion.

21. The cooking and/or temperature-maintaining device as claimed in claim 20, wherein the first thickness of the glass-ceramic plate is 1.5 to 3.5 mm.

* * * * *